United States Patent [19]

Martin

[11] Patent Number: 4,677,887
[45] Date of Patent: Jul. 7, 1987

[54] BAND SAW STAND

[76] Inventor: Leonard G. Martin, Box 217, Yanceville, N.C. 27379

[21] Appl. No.: 794,479

[22] Filed: Nov. 4, 1985

[51] Int. Cl.⁴ ............................................. B27B 13/00
[52] U.S. Cl. ...................................... 83/788; 30/374; 30/380; 83/448; 83/574
[58] Field of Search .................... 30/374, 380; 83/438, 83/442, 448, 574, 788; 144/35 A

[56] References Cited

U.S. PATENT DOCUMENTS 4,202,233  5/1980  Larson .............................. 83/574 X
4,208,937  6/1980  Marshall .......................... 83/574 X
4,502,518  3/1985  Lewin ............................... 83/574 X
4,558,618  12/1985  Bachmann et al. .................... 83/438

Primary Examiner—E. R. Kazenske
Assistant Examiner—Michael D. Folkerts

[57] ABSTRACT

The band saw stand presented herein comprises a base and a pair of vertical support member for maintaining a portable band saw in a secure upright position. A worktable and guide are attachable to the saw stand whereby the device can be quickly assembled and disassembled as required at a job site and in use allows the operator freedom of both hands to guide a workpiece for cutting accuracy.

6 Claims, 2 Drawing Figures

BAND SAW STAND

BACKGROUND OF THE INVENTION

1. Field Of The Invention

The device as presented herein relates to electrically powered hand tools and specifically to a device which holds a portable band saw in a stable upright position.

2. Description Of The Prior Art And Objectives Of The Invention

In recent years relatively small, portable band saws have become popular among maintenance men, carpenters, plumbers, machinists and others and several manufacturers produce models which weigh between approximately 15 and 20 pounds and have 115 volt A.C.-D.C. motors with a blade having no-load speed which may be variable from 82 to 245 surface feet per minute and the overall length of the saw may range from 19½ to 23¼ inches.

Many larger machine shops have conventional floor or table mounted band saws but for work that is generally done on site some distance from the shop, portable band saws are commonly used since larger stationary saws cannot be conveniently carried or transported quickly from job to job.

With the inconvenience and disadvantages of conventional band saws it has been determined that a smaller portable band saw can be of more use and versatility if it can be held and rigidly secured so that its blade moves vertically and the operators hands are free to guide material thereto. Thus, the present invention was conceived and one of its objectives is to provide a band saw stand for small portable band saws which will securely hold the saw and which can be easily moved from location to location as needed.

It is another objective of the present invention to provide a portable band saw stand which comprises a base for securement to a workbench, shelf or the like and which includes two (2) diagonally opposed vertical channel-shaped members for receiving the saw.

It is still another objective of the present invention to provide a band saw stand which includes a clamping member for temporarily holding the stand in a rigid posture on a temporary basis.

It is yet another objective of the present invention to provide a saw stand which includes a worktable and guide to assist in accurately cutting materials while the saw is positioned in the stand.

Various other objectives and advantages of the present invention become apparent to those skilled in the art as a more complete description of the invention is set forth below.

SUMMARY OF THE INVENTION

The present invention comprises a portable band saw stand which includes a base and two (2) diagonally positioned vertical supports for engaging the saw to hold it in an upright position. The base is attachable to a horizontal workbench or shelf as required. A worktable and guide are provided to assist the user in making precise, accurate cuts and one embodiment of the invention includes a clamp member which is rotatably attached to the base for convenient use.

BRIEF DESCRIPTION OF THE DRAWINGS

FIG. 2 demonstrates a second embodiment of the stand having a clamp member rotatably attached thereto for ease in mounting to a horizontal worktable or the like.

DESCRIPTION OF THE PREFERRED EMBODIMENT

Figure 2:
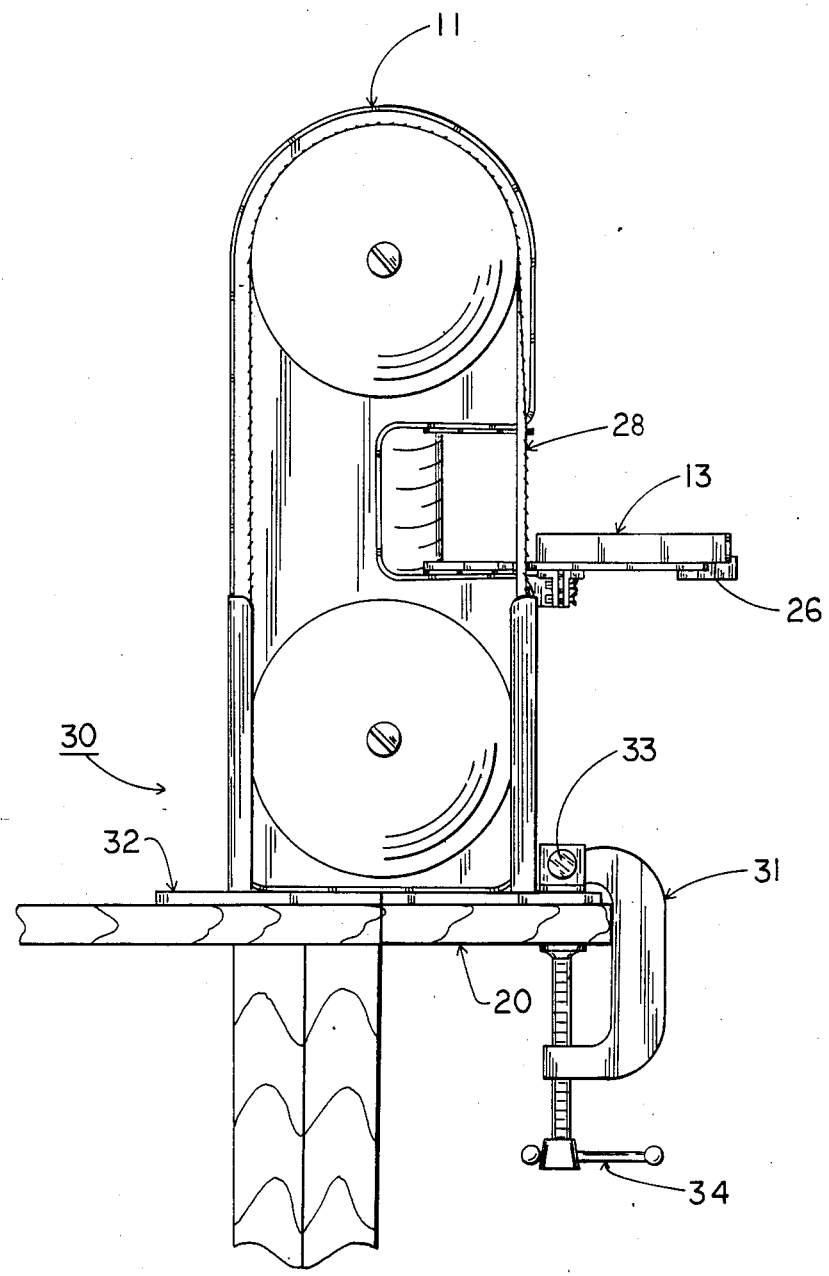

The form of the invention as shown in FIG. 2 demonstrates the invention in its preferred form which includes a band saw stand for holding a portable band saw and includes a hingable clamp to hole the stand to a table or the like. Shown in combination with the stand is a worktable having a movable guide thereon which will assist the operator in making smooth, uniform cuts. The stand includes a base having a pair of vertical supports opposingly attached thereto, said supports being substantially channel-shaped to receive the saw. The supports are diagonally positioned on the base and have side walls of different widths to easily and quickly position or remove the saw therefrom.

DETAILED DESCRIPTION OF THE DRAWINGS

Figure 1:
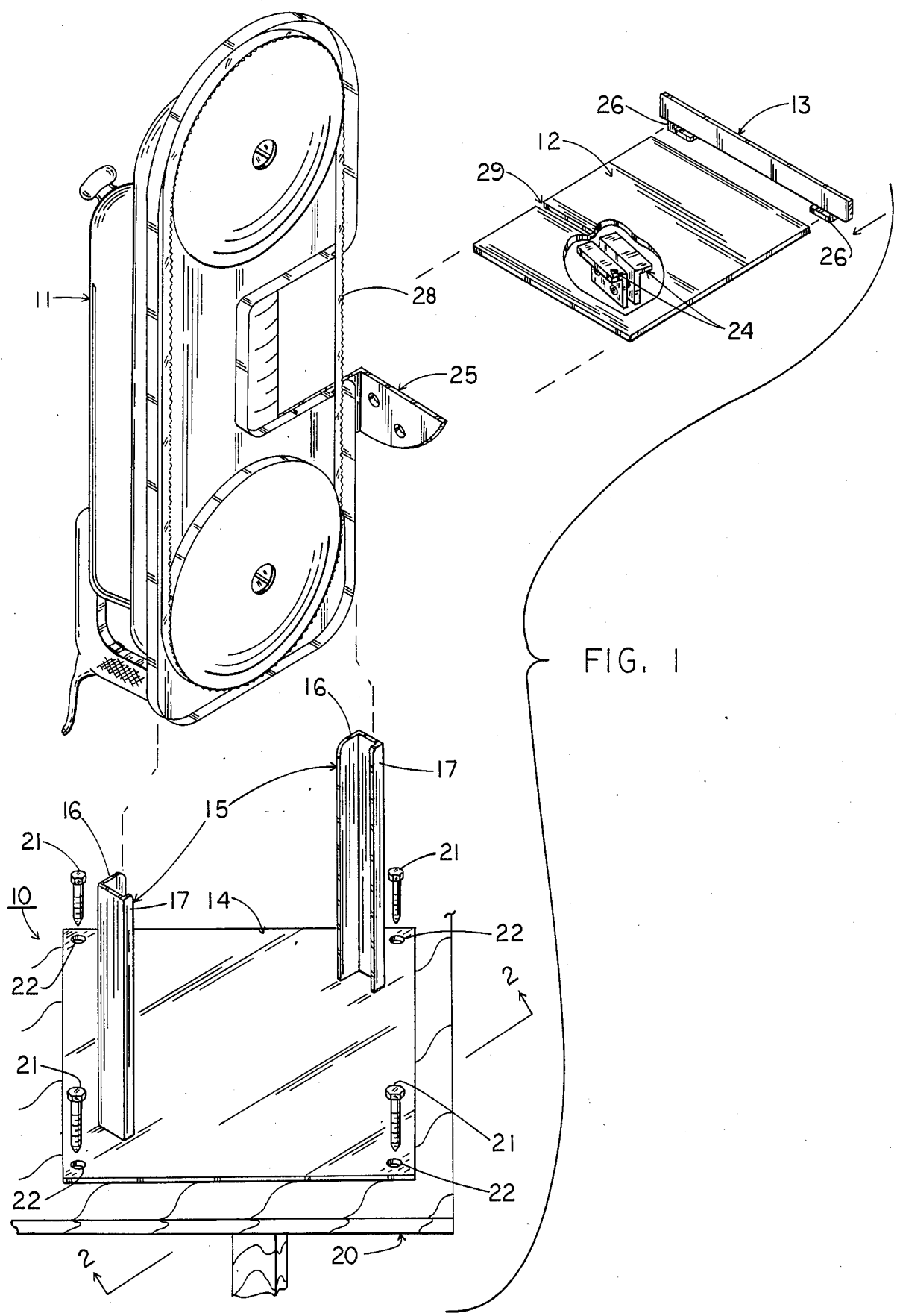
FIG. 1 demonstrates in exploded fashion the combination portable band saw and stand.

For a more complete understanding of the invention, turning now to the drawings, FIG. 1 demonstrates band saw stand 10, band saw 11, worktable 12 with table guide 13, the combination being shown in exploded fashion. Stand 10 includes base 14 having diagonally and opposingly positioned vertical support members 15 attached thereto. Vertical support members 15 include side walls 16 which are of a greater width than side walls 17. The differences in the side wall widths allow for ease in positioning and receiving band saw 11 therein. Band saw 11 employs a conventional endless blade 28. Saw stand 10 is mounted on table 20 by securing means 21 which pass through aperatures 22 in the embodiment as shown in FIG. 1.

In order for the user to take full advantage of saw 11 positioned in stand 10, worktable 12 is provided. As seen in the cut-away portion, brackets 24 are mounted underneath worktable 12 which are fastened on either side of saw stop 25. Worktable 12 includes blade slot 29. Worktable 12 is thereby bolted to saw stop 25 to provide a convenient material rest. Also shown in FIG. 1 is work guide 13 which is slidably received by worktable 12 whereas L-shaped brackets 26 slidably grip worktable 12 as better shown in FIG. 2.

The second embodiment, stand 30 is shown in FIG. 2 whereby clamping means 31 is pivotably mounted on base 32 by axle 33. As would be understood handle 34 can be rotated and clamping means 31 loosened and pivoted in an upward counterclockwise direction thereby releasing saw stand 30 from table 20.

Stand 30 as shown in FIG. 2 provides a quick and easy manner of attaching the saw stand to a horizontal table top, shelf or the like and can be easily removed and saw stand 30 is movable from place to place as needed.

Various manufacturers produce portable band saws and the saw stand shown herein demonstrate working examples but such illustrations are not intended to limit the scope of the appended claims.

I claim:

1. A stand for a portable band saw, comprising: a rectangularly shaped planar base, said base having a top and a bottom surface, a pair of channel shaped vertical supports, said vertical supports opposingly, diagonally attached to said base, said vertical supports for receiving the band saw to hold it upright on the base clamping means, said clamping means pivotally affixed to said top surface of said base, said clamping means pivotable about an axis parallel to said base for securing a support structure to the bottom surface of said base.

2. A stand for a portable band saw as claimed in claim 1 wherein said vertical supports have side walls of uneven widths.

3. A stand for a portable band saw comprising: a planar rectangular base, a pair of channel shaped vertical supports, said vertical supports mounted diagonally on said base, c-shaped clamping means, said clamping means mounted on said base, said clamping means pivotable about an axis parallel to said base for affixing said base on a support, said vertical supports having side walls of uneven widths to facilitate reception of a band saw, whereby a portable band saw can be positioned in said vertical supports.

4. A saw, stand and worktable in combination comprising: a portable band saw, said saw having a saw stop, a stand having a planar base, said base including a pair of vertical supports which are opposingly positioned, said vertical supports for receiving said saw to hold it in an upright posture, said supports comprising channel members, a clamping means, said clamping means mounted to the top of said base, said clamping means pivotable about an axis parallel to said base, a handle, said handle joined to said clamping means for releasably securing said clamping means to a horizontal support underneath said base, a planar worktable, said worktable having a pair of brackets mounted underneath, said brackets for affixing said worktable to said saw stop, a table guide, said table guide including a pair of L-shaped gripping means, and said table guide slidably mounted on said worktable.

5. A saw stand and worktable combination as claimed in claim 4 wherein said clamping means is c-shaped.

6. A saw, stand and worktable combination as claimed in claim 4 wherein said handle is rotatable.

* * * * *